United States Patent
Spiller

(10) Patent No.: US 9,248,918 B2
(45) Date of Patent: Feb. 2, 2016

(54) HIGH LIFT SYSTEM FOR AN AIRCRAFT AND METHOD FOR DETECTING FAULTS IN A HIGH LIFT SYSTEM FOR AN AIRCRAFT

(75) Inventor: Olaf Spiller, Hude (DE)

(73) Assignee: Airbus Operations GmbH, Hamburg (DE)

( * ) Notice: Subject to any disclaimer, the term of this patent is extended or adjusted under 35 U.S.C. 154(b) by 60 days.

(21) Appl. No.: 13/264,287

(22) PCT Filed: Apr. 14, 2010

(86) PCT No.: PCT/EP2010/054861
§ 371 (c)(1),
(2), (4) Date: Nov. 29, 2011

(87) PCT Pub. No.: WO2010/119049
PCT Pub. Date: Oct. 21, 2010

(65) Prior Publication Data
US 2012/0091282 A1    Apr. 19, 2012

Related U.S. Application Data

(60) Provisional application No. 61/169,808, filed on Apr. 16, 2009.

(30) Foreign Application Priority Data

Apr. 16, 2009  (DE) .......................... 10 2009 002 435

(51) Int. Cl.
*B64C 3/58* (2006.01)
*B64D 45/00* (2006.01)
*B64C 9/16* (2006.01)

(52) U.S. Cl.
CPC ............. *B64D 45/0005* (2013.01); *B64C 9/16* (2013.01); *B64D 2045/001* (2013.01); *Y02T 50/44* (2013.01)

(58) Field of Classification Search
CPC .......... Y02T 50/32; B64C 3/32; B64C 9/323; G01R 3/007; B60C 23/061; G07C 5/085
USPC ............................................ 244/210–217, 87
See application file for complete search history.

(56) References Cited

U.S. PATENT DOCUMENTS 2,661,170 A    12/1953  Chamberlin
2,853,256 A *  9/1958  Schmidt et al. ............. 244/90 B
(Continued)

FOREIGN PATENT DOCUMENTS

CN         101506050       8/2009
DE    10 2005 062 919      6/2005
(Continued)

OTHER PUBLICATIONS

Kionix "Accelerometer Error", pp. 1 of 1, pp. 2 of 2, 2007.*
(Continued)

*Primary Examiner* — Tien Dinh
*Assistant Examiner* — Assres H Woldemaryam
(74) *Attorney, Agent, or Firm* — Greer, Burns & Crain Ltd.

(57) ABSTRACT

The present invention relates to a high lift system for an aircraft, comprising a flap, which is arranged on a wing box and which can be moved between a retracted position and at least one extended position relative to the wing box by means of a drive device, a support construction, which is arranged on the wing box in the area of the drive device and to which the flap is coupled and which comprises a movable support element, which can be moved to move the flap relative to the wing box, and an acceleration sensor arranged in the area of the flap or the movable support element for detecting accelerations of the flap.

16 Claims, 5 Drawing Sheets

Fig. 2

(56) References Cited

U.S. PATENT DOCUMENTS

| | | | |
|---|---|---|---|
| 2,949,259 A * | 8/1960 | Bell | 244/181 |
| 4,079,902 A * | 3/1978 | Ryzhko et al. | 244/228 |
| 4,124,180 A * | 11/1978 | Wolowicz | 244/82 |
| 4,648,569 A * | 3/1987 | Stewart | 244/76 R |
| 4,676,460 A * | 6/1987 | Hagy et al. | 244/76 R |
| 5,135,186 A * | 8/1992 | Ako | 244/78.1 |
| 5,224,667 A * | 7/1993 | Lacabanne | 244/191 |
| 5,366,176 A * | 11/1994 | Loewy et al. | 244/99.8 |
| 5,913,492 A * | 6/1999 | Durandeau et al. | 244/82 |
| 6,349,900 B1 * | 2/2002 | Uttley et al. | 244/82 |
| 6,827,311 B2 * | 12/2004 | Wingett et al. | 244/99.5 |
| 7,007,897 B2 * | 3/2006 | Wingett et al. | 244/227 |
| 7,090,172 B2 * | 8/2006 | Kubica et al. | 244/195 |
| 7,216,055 B1 * | 5/2007 | Horton et al. | 702/153 |
| 7,549,605 B2 * | 6/2009 | Hanlon et al. | 244/75.1 |
| 7,770,839 B2 * | 8/2010 | Iwata | 244/38 |
| 7,770,842 B2 * | 8/2010 | Benson | 244/75.1 |
| 8,181,903 B2 * | 5/2012 | Posva | 244/12.3 |
| 8,302,913 B2 | 11/2012 | Schlipf | |
| 2004/0195441 A1 | 10/2004 | Wingett et al. | |
| 2007/0080261 A1 | 4/2007 | Neumann et al. | |
| 2007/0272023 A1 * | 11/2007 | Dwyer et al. | 73/649 |
| 2009/0308982 A1 * | 12/2009 | Schlipf | 244/215 |
| 2010/0059633 A1 * | 3/2010 | Pohl | 244/215 |
| 2010/0094312 A1 * | 4/2010 | Ruiz Morales et al. | 606/130 |

FOREIGN PATENT DOCUMENTS

| | | | | |
|---|---|---|---|---|
| DE | 103 53 672 | | 6/2005 | |
| EP | 0922633 | | 6/1999 | |
| EP | 1 306 305 | | 5/2003 | |
| RU | 2007125193 | | 11/2009 | |
| WO | WO 01/08971 | | 2/2001 | |
| WO | WO 2007/074173 | * | 7/2007 | B64C 3/50 |

OTHER PUBLICATIONS

German Office Action from the German Patent Office in the corresponding priority application 10 2009 002 435.2.
Chinese Office Action, Nov. 5, 2013.
Russian Office Action, Feb. 21, 2013 and English Translation.

* cited by examiner

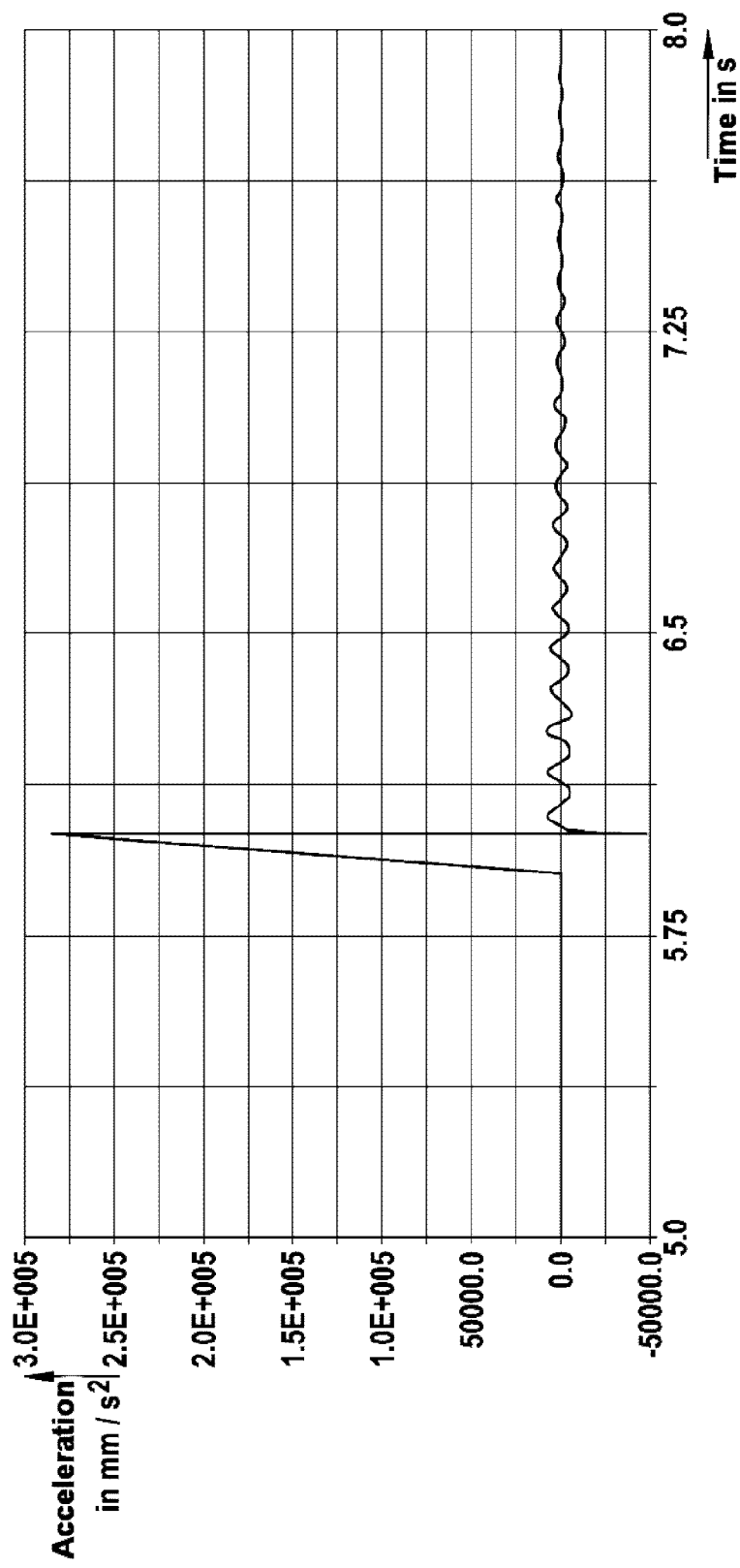

HIGH LIFT SYSTEM FOR AN AIRCRAFT AND METHOD FOR DETECTING FAULTS IN A HIGH LIFT SYSTEM FOR AN AIRCRAFT

CROSS-REFERENCE TO RELATED APPLICATIONS

This application claims the benefit of U.S. Provisional Application No. 61/169,808, filed Apr. 16, 2009 and German Patent Application No. 10 2009 002 435.2, filed Apr. 16, 2009, the entire disclosures of which are herein incorporated by reference.

FIELD OF THE INVENTION

The present invention concerns a high lift system for an aircraft and a method for the detection of faults in a high lift system for an aircraft.

High lift systems for aircraft generally comprise flaps, for example landing flaps, which are arranged on the wing box of the aerofoils of an aircraft and are displaceable via an actuating drive between a retracted position, in which the flap continuously supplements the wing profile in a manner substantially free of gaps, and a plurality of extended positions, in which a gap of a given width forms between the wing and flap and the flap is arranged at a preset angle to the wing profile. The extension of the flap generally takes place in a movement which comprises on the one hand a displacement of the flap backwards with respect to the wing and thus an elongation of the operative wing profile, and on the other hand an increase of the pitch of the flap with augmentation of the profile curvature and accompanying increase of the aerodynamic lift. Air flows from the lower face of the wing to the upper face of the flap at high speed through the gap formed between the flap and wing during the extension movement, further contributing to the lift increase.

Generally, a flap of a high lift system is moved via two separate but coordinated drive devices. If one of the drive devices is not able to move the flap in the desired way because of a malfunction, there is the danger that the flap will tilt or twist. This can lead to damage of the flap or wing box or to loss of the flap.

So-called drop hinge kinematics or pivot flap kinematics are a commonly used type of high lift system. In this case the flap is pivotably mounted on a support construction about a point of rotation provided under the wing box. When the extension of the flap takes place, the flap is moved about the point of rotation, which is under the wing box, on a path which has the form of an arc of a circle.

DE 10 2005 062 919 A1 (see also WO 2007/074173 A2) discloses an aerofoil and a flap for an aircraft, which flap is rotatably mounted on the wing box with respect to a flap axis of rotation, the position of the flap relative to the wing box being detected using a rotation sensor and consequently a maloperation of the displacement mechanism of a landing flap being reliably detected.

In systems of this type, however, the detection of a fault is only possible after a static end position of the flap has been reached. Additional measures are even taken in order to fade out dynamic processes, for example short-term overshoot, in order to prevent false alarms. For this purpose, it is ensured that a fault is only detected when there is a flap movement or difference in the angle of rotation between the relevant drive devices which clearly differs from the movements which take place under normal conditions, for example owing to different loads in a landing shock. Particular requirements with respect to the design and layout of the drive devices result from the use of pivot flap kinematics in particular. For example, the rigidity of the flaps or the load paths for receiving the sensors must be designed with respect to the reliable detection of faults in such a way that overall only a suboptimal design of the high lift system is provided.

SUMMARY OF THE INVENTION

It is thus an object of the invention to design a high lift system for an aircraft in such a way that faults in the drive devices of a flap arranged on a wing box can be detected using simple means.

A further object of the invention is to provide a method with which a simple detection of a fault in a drive device of a flap arranged on a wing box of an aircraft can be simply and reliably detected.

The object of the invention is achieved by a high lift system for an aircraft comprising a wing box, a flap which is arranged on the wing box and is displaceable with respect to the wing box between a retracted position and at least one extended position by means of a drive device, a support construction arranged on the wing box, to which support construction the flap is coupled and which comprises a movable support element which is movable with respect to the wing box for the displacement of the flap, and an acceleration sensor for the detection of movements in the form of accelerations of the flap, which sensor is arranged in the region of the flap or the movable support element.

In the event of a fault of the drive device, acceleration values occur which clearly differ from the acceleration values detected under normal conditions. The evaluation of acceleration signals in the region of the flap is thus suitable for the detection of a malfunction of the drive device or damage to the support construction. The use of acceleration sensors in this case has the advantage that no additional measures such as, for example, a particular design of the high lift system, are necessary, which measures have undesirable negative effects on the high lift system. Furthermore, owing to their small and light construction the use of acceleration sensors also leads to a reduction in weight compared to the forms of sensors usually used.

In one embodiment the movable support element is rotatably mounted relative to the wing box with respect to a flap axis of rotation and the flap attached to the movable support element rotates in the case of rotation of the movable support element relative to the wing box with respect to the flap axis of rotation. In pivot flap kinematics of this type the negative effects owing to the design adjustments required for the use of other detection principles are particularly great, meaning that the use of an acceleration sensor offers particularly clear advantages. Despite this, the invention can, however, obviously also be used for any other type of high lift system, for example for a so-called Fowler flap.

According to a further embodiment of the invention the acceleration sensor is arranged on an end of the movable support element which faces the flap. The arrangement on the movable support element offers the advantage of a very simple attachment which can be carried out at low cost. The arrangement on the end of the support element which faces the flap ensures a sufficient distance from the axis of rotation and thus sufficient amplitude of the acceleration signal for the reliable detection of a fault. According to the invention the acceleration sensor can however be arranged in any location on the movable support element or the flap.

According to a particular embodiment of the invention the acceleration sensor is designed as a three-axis acceleration sensor. Owing to production and installation tolerances, standardisation, that is to say orientation to a preset acceleration direction, is necessary in the run-up to the beginning of operation. This can, for example, take place in the form of a calibration on a still, parked aircraft and is particularly simple to carry out using three-axis acceleration sensors.

In accordance with the method according to the invention for the detection of faults in a high lift system for an aircraft comprising a flap which is arranged on the wing box and is displaceable with respect to the wing box between a retracted position and at least one extended position by means of a drive device, and a support construction arranged on the wing box, to which support construction the flap is coupled and which comprises a movable support element which is movable with respect to the wing box for the displacement of the flap, the movement of the flap in the form of the acceleration of the flap is detected using an acceleration sensor, the output signal of the acceleration sensor is compared with a set value or set curve via an evaluation unit, and a fault in the drive device is detected using the deviations of the output signal from the set value or set curve.

A further embodiment of the method emerges for aircraft which comprise a plurality of acceleration sensors for the detection of accelerations of flaps of a high lift system. This is on the one hand the case when a flap has a plurality of drive devices, usually two, with associated support constructions and/or when the aircraft is equipped with a plurality of high lift systems. If output signals exist for a plurality of acceleration sensors, the output signals of the acceleration sensors can be analysed by the evaluation unit, in such a way that output signals which are detected at all acceleration sensors in equal or almost equal measure are disregarded for fault detection. In this embodiment, disturbances such as gravitational pull, accelerations owing to flight dynamic conditions and landing shocks are to be recognised in that they occur virtually simultaneously in almost the same magnitude and direction of action at all drive devices. In this way, the disturbances can easily be filtered out by the evaluation unit.

In the following, the invention will be described in more detail on the basis of embodiments with reference to the accompanying figures.

BRIEF DESCRIPTION OF THE DRAWINGS

In the figures:

FIG. 4c shows an output signal of the acceleration sensor in the event of a fault, shown for the z-axis;

DESCRIPTION OF EXEMPLARY EMBODIMENTS

Figure 1:
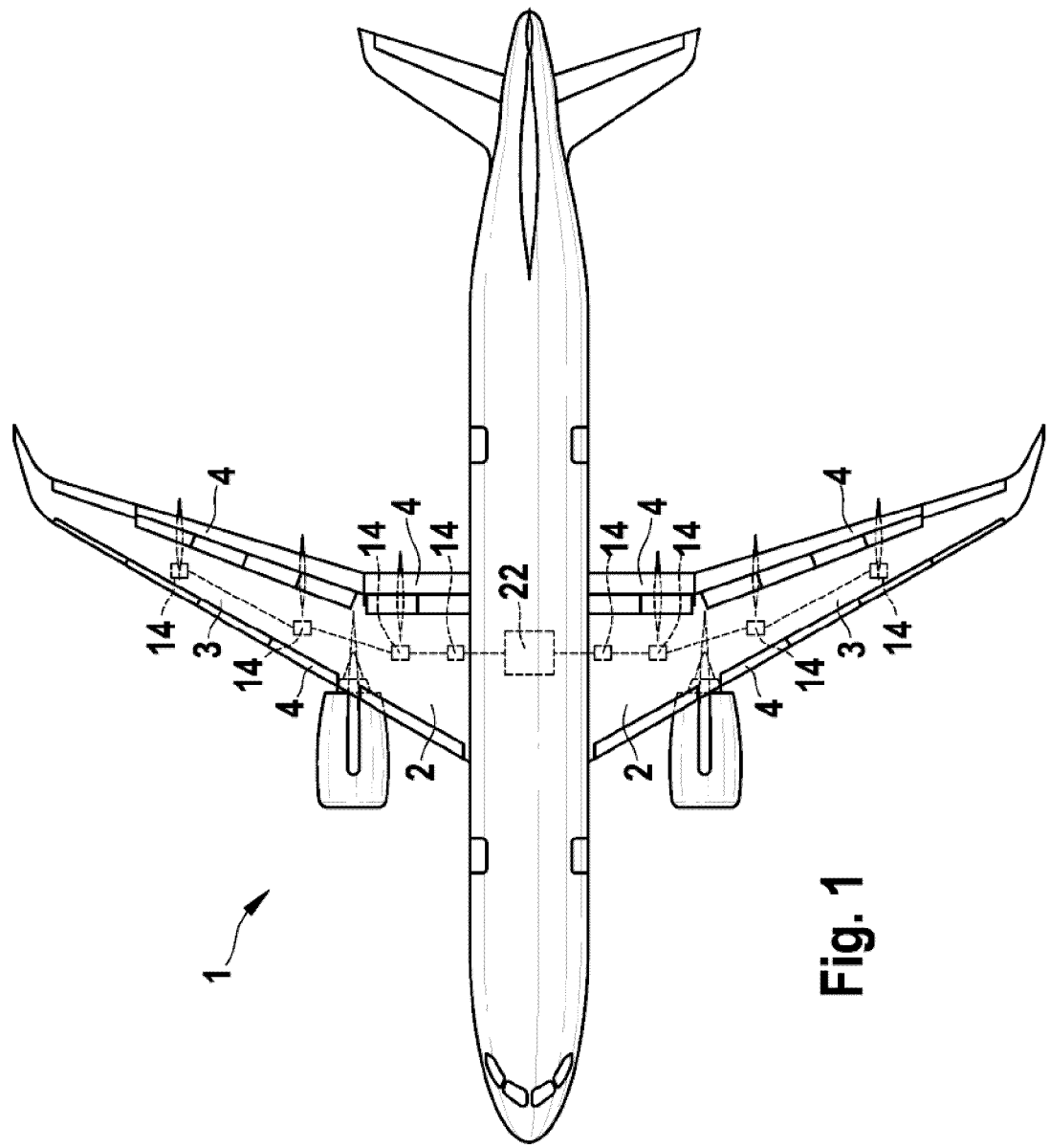
FIG. 1 shows a schematic representation of an aircraft comprising aerofoils.

In the figures, like reference numerals denote like or functionally identical components, unless indicated otherwise.

In FIG. 1 an aircraft 1 comprising aerofoils 2 is shown. The aerofoils 2 each comprise a wing box 3 and a plurality of flaps 4, which are arranged both on the front edge of the wing box 3 and on the rear edge of the wing box 3. The flaps 4 arranged on the rear edge of the wing box 3 are generally referred to as landing flaps. The flaps 4 arranged on the front edge of the wing box 3 are often referred to as slats. For the retraction and extension of the flaps 4, each of the flaps 4 is connected in each case to two drive devices or drive stations 14, which are arranged in or on the wing boxes 3. The drive devices 14 are only indicated schematically in FIG. 1 and to simplify the illustration they are only shown for the flaps 4 on the rear edge of the wing box 3 which are formed as landing flaps. FIG. 1 shows an aircraft 1 comprising two landing flaps in each case on every wing box 3. In this case the landing flap nearer to the fuselage is generally referred to as an inner landing flap and the other is referred to as an outer landing flap.

Figure 2:
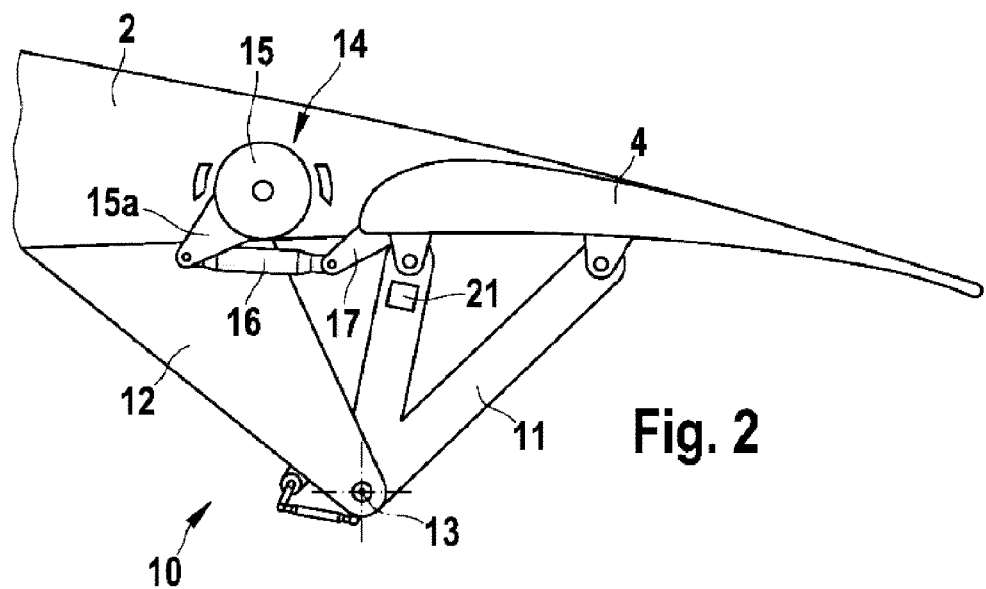
FIG. 2 shows a schematic sectional representation of a high lift system for an aircraft according to an embodiment of the invention.

FIG. 2 shows a cross section of an embodiment of a high lift system according to the invention. A support construction 10 comprises a movable support element 11 and a fixed support element 12. The movable support element 11 is rotatably mounted on the fixed support element 12, which is attached to the wing box 3, with respect to a flap axis of rotation 13 which extends perpendicular to the plane of projection 13. A flap 4 formed as a landing flap is thus also rotatably mounted via the support elements 11 and 12 with respect to the flap axis of rotation 13 relative to the wing box 3.

The flap 4 is intended to be operated in different positions relative to the wing boxes 3 when the aircraft 1 is in operation. During normal flight the flap is arranged in the retracted position relative to the wing box 3 shown in FIGS. 1 and 2. In order to increase the aerodynamic lift of the aircraft 1, in particular during take-off and landing, the flap 4 can be moved into an extended position (not shown) relative to the wing box 3. During the movement between the retracted position (shown) and the extended position (not shown) the landing flap rotates about the flap axis of rotation 13.

In order to move the flap 4 between the retracted and extended positions, the high lift system comprises a drive device 14 having an actuator 15 which is coupled to the flap 4 in order to rotate the flap about the flap axis of rotation 13 when the actuator 15 is activated. For this purpose an output lever or a crank 15a of the actuator 15 is coupled to a connecting piece 17 of the landing flap 2 via a compression-tension element 16 which is often also referred to as a drive strut. In this case, the compression-tension element 16 is coupled to the output lever or the crank 15a and the connecting piece 17 in a rotatable manner in each case. The whole drive device thus comprises the actuator 15, the output lever 15a, the compression-tension element 16 and the connecting piece 17 of the landing flap 2. Alternatively, the compression-tension element 16 can also be designed as a simple drive rod.

In accordance with the illustration in FIG. 2, the actuator 15 is arranged inside the wing box 3. It can, however, equally be arranged in the region of the fixed support element 12 without affecting the use of the invention. For the use of the invention it is only important that the flap 4 is displaceable by means of a drive device, for example in the form of the actuator 15 shown in connection with the compression-tension element 16, the output lever 15a and the connecting piece 17, and that a support construction arranged on the wing box 3 is provided, which support construction is, for example, in the form of the support elements 11 and 12 shown, to which support construction the flap 4 is coupled, and which comprises a movable support element, for example in the form of the movable support element 11, which is movable with respect to the wing box 3 for the displacement of the flap 4. Numerous further configurations for which the invention is applicable therefore emerge in addition to the embodiment shown.

Figure 3:
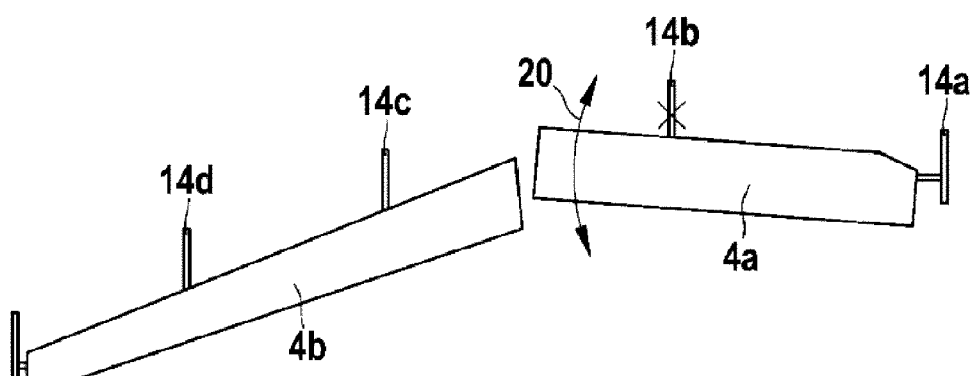
FIG. 3 shows a schematic plan view of the flaps of a high lift system according to an embodiment of the invention.

FIG. 3 schematically shows in the plan view two flaps, for example an inner landing flap 4a and an outer landing flap 4b of high lift systems of an aircraft 1. On the two landing flaps 4a and 4b two drive devices 14a and 14b or 14c and 14d are provided in each case for the displacement of the flap 4a or 4b. An exemplary notional malfunction of the drive device 14b of the inner landing flap 4a, indicated by a cross on the drive device 14b, leads to an unwanted movement of the inner landing flap 4a in the direction of the circular path indicated by a double arrow 20. In this case, a malfunction or fault is to be understood as any type of interruption to the operative connection between the drive device 14b of the flap 4a and the flap 4a itself. An interruption of this type to the operative connection can, for example, be caused by a breaking of the axle of the actuator 15 or also the breaking off of teeth on a gearwheel of the actuator 15. In the case of faults of this type in the region of the actuator 15, a "free wheel" is also often spoken about. A malfunction of the high lift system can however also be attributed to a break of the compression-tension element 16 or a pulling out of the pivotal points on the output lever 15a of the actuator 15 or the connecting piece 17 of the flap 2.

The unwanted movement of the landing flap 4a caused by the malfunction of the drive device 14b is detected using an acceleration sensor 21, which is arranged in the region of the flap or the support element. In this case, according to the invention the acceleration sensor 21 can be arranged at any point on the movable support element 11 or the flap 4. Advantageously, the acceleration sensor 21 is, however, arranged on an end of the movable support element 11 which faces the flap 4. On the one hand, it is possible to fix the acceleration sensor 21 there easily and at low cost. On the other hand, a sufficient distance from the acceleration sensor 21 to the axis of rotation 13 is achieved in this way so that sufficient amplitude of the acceleration signal is ensured for the reliable detection of a fault.

Figure 4A:
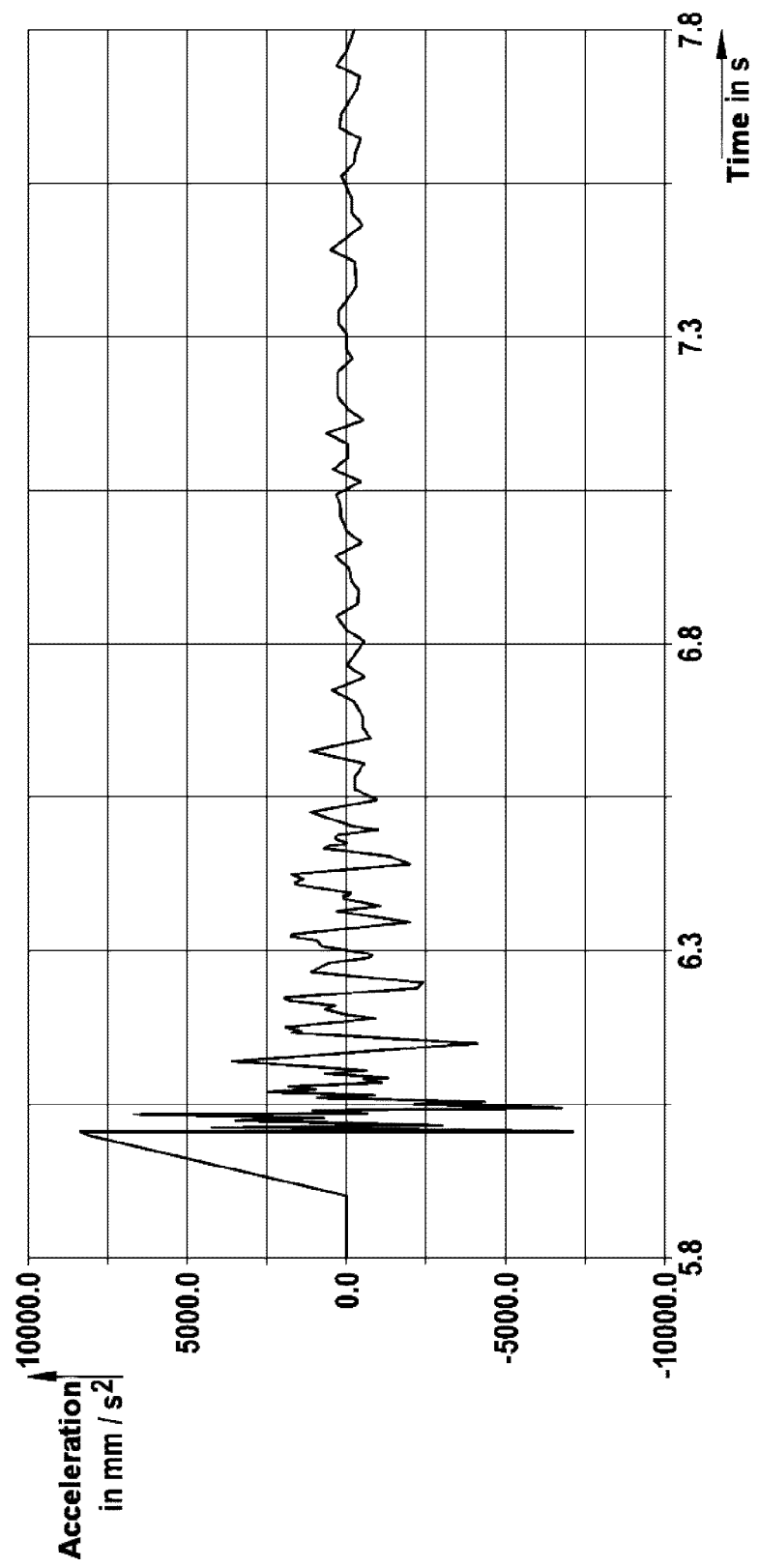
FIG. 4a shows an output signal of the acceleration sensor in the event of a fault, shown for the x-axis.
Figure 4B:
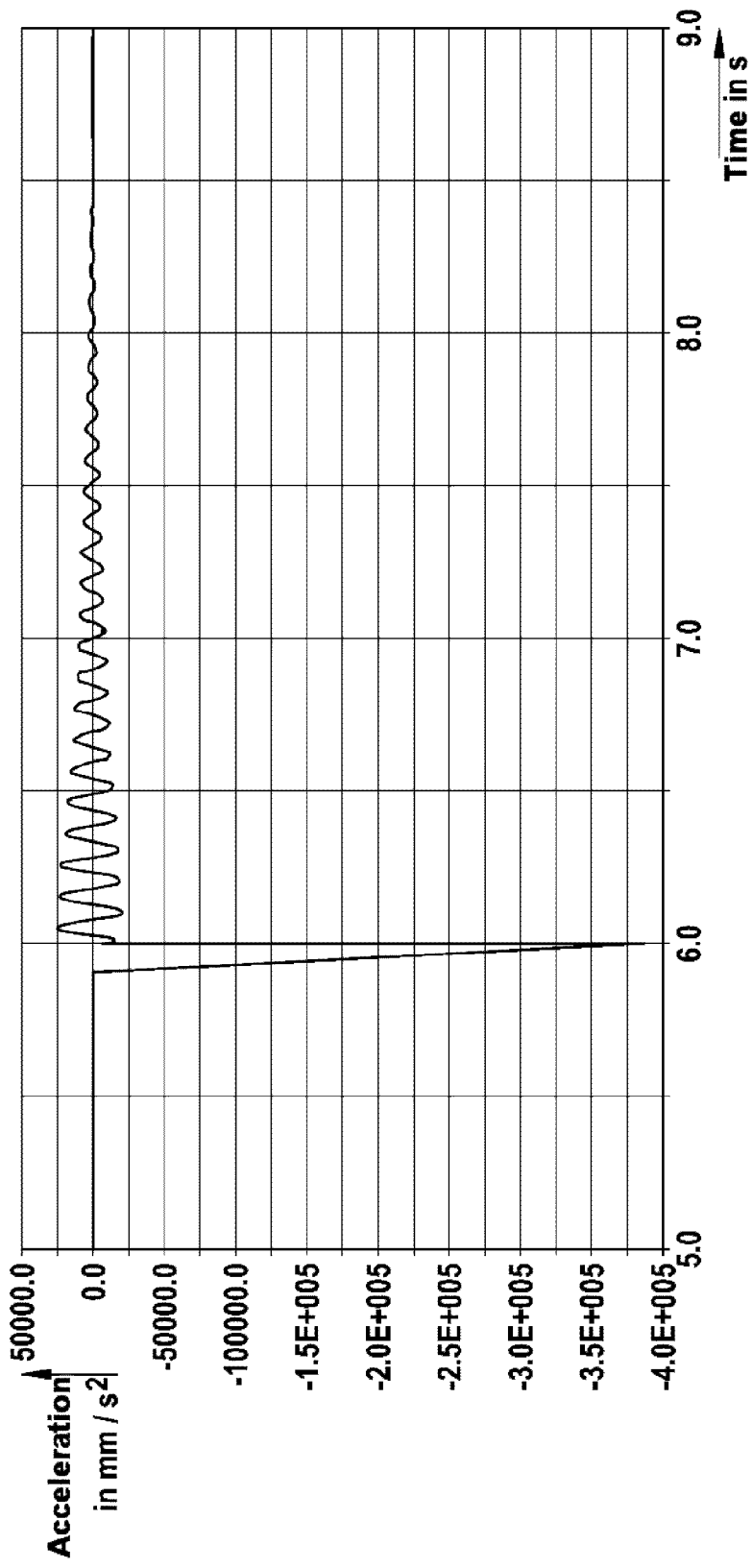
FIG. 4b shows an output signal of the acceleration sensor in the event of a fault, shown for the y-axis.

In FIGS. 4a, 4b and 4c output signals of the acceleration sensor 21 are shown over time for the exemplary notional malfunction of the drive device 14b of the inner landing flap 4a. In this case FIG. 4a depicts the curve of the acceleration in a spanwise direction (x-axis; positive to the wing tip), FIG. 4b depicts the curve of the acceleration in the flight direction (y-axis; positive in flight direction) and FIG. 4c depicts the curve of the acceleration in a horizontal direction (z-axis; positive upwards). As can be seen in the figures, considerable amplitudes appear at the moment of the notional malfunction when t=6 s in all three acceleration directions, the signal amplitudes reached representing a multiple of the values which occur during faultless operation. In the event of a fault, a largely stable final state will also eventually result after a given transient phase, which final state basically depends on the acting aerodynamic forces.

The output signals of the acceleration sensor 21 are transmitted to an evaluation unit 22, for example an on-board computer, and analysed thereby. The evaluation unit 22 is either arranged in the region of the fuselage, as indicated in FIG. 1, or in the region of the wing box 3. An integration of the evaluation unit 22 with the respective acceleration sensor 21 is also conceivable. Inside the evaluation unit 22 the output signals of the acceleration sensor 21 can either be directly analysed or on the basis of the output signals with the help of appropriate programmes and/or algorithms variables such as speed, path, force, oscillation frequency and/or oscillation duration can be derived. Using the evaluation unit, the output signals themselves or at least one of these variables is compared with preset set values or set curves, which represent a faultless condition of the high lift system. If this results in a deviation, which exceeds a preset threshold value, a fault of the corresponding drive component is detected.

For the identification of a fault, influencing variables acting as disturbances, such as gravitational pull, accelerations owing to flight dynamic conditions or a landing shock, occur in all drive devices in almost identical magnitude and direction of action, which has a direct effect on the output signals of the respective acceleration sensors. Output signals of this type can easily be filtered out by the evaluation unit 22 and are therefore not considered in the fault detection.

Owing to the fact that all acceleration sensors 21 continuously measure gravitational pull it is further possible to ascertain the spatial orientation of the acceleration sensors 21 in their location based on the gravitational pull vector and thus calibrate production and installation tolerances of a still, parked aircraft therefrom. With the use of three-axis acceleration sensors this calibration is possible in a particularly simple manner.

Although the present invention has been described with reference to a preferred embodiment, it is not restricted thereto and can be modified in a variety of ways. In particular, the use of acceleration sensors for the detection of a fault of a high lift system for an aircraft is of course in no way limited to the pivot flap kinematics described and can be used for any type of high lift system in which an unwanted and analysable acceleration of the flap occurs in the event of a fault. For this reason the present invention is also not limited to landing flaps and can be used for all high lift systems having a flap arranged on a wing box of an aircraft and displaceable by means of a drive device, and a support construction arranged on the wing box and coupled to the flap, for example, therefore, also for slats.

LIST OF REFERENCE NUMERALS 1 aircraft
2 aerofoil
3 wing box
4 flap
4a flap
4b flap
10 support construction
11 movable support element
12 fixed support element
13 flap axis of rotation
14 drive device
14a drive device
14b drive device
14c drive device
14d drive device
15 actuator
15a output lever
16 compression-tension element
17 connecting piece
21 acceleration sensor
22 evaluation unit

The invention claimed is:
1. A high lift system for an aircraft comprising
a wing box,
a flap which is arranged on the wing box and is displaceable with respect to the wing box between a retracted position and at least one extended position by means of a drive device,
a support construction which is arranged on the wing box in the region of the drive device to which support construction the flap is coupled and which comprises a movable support element which is movable with respect to the wing box for the displacement of the flap, and an acceleration sensor for the detection of movements of the flap in the form of accelerations of the flap, which sensor is arranged in the region of the flap or the movable support element, wherein an output signal of the acceleration sensor or a quantity derived therefrom is compared with one of a set value and a set curve using an evaluation unit, wherein, using the deviations of the output signal or a quantity derived therefrom from the one of the set value and set curve, unwanted movements caused by a fault in the drive device are detected, and wherein the acceleration sensor is designed as a three-axis acceleration sensor configured to be calibrated to a preset acceleration direction with respect to the acceleration sensor's orientation.

2. The high lift system according to claim 1, wherein the movable support element is rotatably mounted relative to the wing box with respect to a flap axis of rotation and the flap attached to the movable support element rotates relative to the wing box with respect to the flap axis of rotation upon rotation of the movable support element.

3. The high lift system according to claim 1, wherein the acceleration sensor is arranged on the movable support element or on the flap.

4. The high lift system according to claim 1, wherein the acceleration sensor is arranged on an end of the movable support element which faces the flap.

5. The high lift system according to claim 1, wherein the flap is a landing flap.

6. The high lift system according to claim 1, comprising
a further drive device, by means of which the flap is displaceable between a retracted position and at least one extended position with respect to the wing box,
a further support construction which is arranged on the wing box in the region of the further drive device, to which support construction the flap or is coupled and which comprises a further movable support element which is movable with respect to the wing box for the displacement of the flap, and
a further acceleration sensor for the detection of accelerations of the flap, which sensor is arranged in the region of the flap or the further movable support element.

7. An aerofoil for an aircraft comprising a high lift system according to claim 1.

8. The aerofoil according to claim 7, wherein the aerofoil comprises a plurality of high lift systems having a plurality of flaps having drive devices and support constructions, and that acceleration sensors for the detection of accelerations of the flaps are arranged on a plurality or all of the flaps or movable support elements of the support constructions.

9. An aircraft comprising at least one aerofoil according to claim 7 and comprising an evaluation unit connected to the acceleration sensor for the evaluation of sensor signals of the acceleration sensor.

10. A method for detection of faults in a high lift system for an aircraft comprising a flap which is arranged on a wing box and is displaceable with respect to the wing box between a retracted position and at least one extended position by means of a drive device, and a support construction which is arranged on the wing box, to which support construction the flap is coupled and which comprises a movable support element which is movable with respect to the wing box for the displacement of the flap, wherein
movement of the flap in the form of acceleration of the flap is detected using a three-axis acceleration sensor,
the acceleration sensor is calibrated with respect to the acceleration sensor's spatial orientation when the aircraft is in an idle state,
an output signal of the acceleration sensor or a quantity derived therefrom is compared with a set value or a set curve using an evaluation unit and,
using the deviations of the output signal or a quantity derived therefrom from the set value or set curve, unwanted movement caused by a fault in the drive device is detected.

11. The method according to claim 10, wherein the aircraft comprises
at least one further drive device, by means of which the flap or a further flap is displaceable between a retracted position and at least one extended position with respect to a wing box of the aircraft,
at least one further support construction which is arranged on the wing box in the region of the further drive device, to which support construction the flap or the further flap is coupled and which comprises a further movable support element which is movable with respect to the wing box for the displacement of the flap or the further flap, and
at least one further acceleration sensor for the detection of accelerations of the flap or the further flap, which sensor is arranged in the region of the flap or the further flap or the further movable support element,
the signals of the acceleration sensors being evaluated by the evaluation unit in such a way that output signals which are detected by all acceleration sensors in equal or almost equal measure are not considered for the fault detection.

12. The method according to claim 10, wherein the three-axis acceleration sensor is calibrated with respect to the acceleration sensor's spatial orientation relative to the gravitational pull vector.

13. A high lift system for an aircraft comprising
a wing box,
a flap which is arranged on the wing box and is displaceable with respect to the wing box between a retracted position and at least one extended position by means of a drive device,
a support construction which is arranged on the wing box in the region of the drive device to which support construction the flap is coupled and which comprises a movable support element which is movable with respect to the wing box for the displacement of the flap, and
an acceleration sensor for the detection of movements of the flap in the form of accelerations of the flap, which sensor is arranged in the region of the flap or the movable support element, wherein the acceleration sensor is designed as a three-axis acceleration sensor configured to be calibrated to a preset acceleration direction with respect to the acceleration sensor's orientation.

14. The high lift system according to claim 13, wherein the three-axis acceleration sensor is calibrateable with respect to the acceleration sensor's spatial orientation relative to the gravitational pull vector.

15. The high lift system according to claim 1, wherein the three-axis acceleration sensor is calibrateable with respect to the acceleration sensor's spatial orientation relative to the gravitational pull vector.

16. A high lift system for an aircraft comprising:
a wing box;
a flap which is arranged on the wing box and is displaceable with respect to the wing box between a retracted position and at least one extended position by means of a drive device;

a support construction which is arranged on the wing box in the region of the drive device to which support construction the flap is coupled and which comprises a movable support element which is movable with respect to the wing box for the displacement of the flap;

an acceleration sensor for the detection of movements of the flap in the form of accelerations of the flap, which sensor is arranged in the region of the flap or the movable support element, wherein an output signal of the acceleration sensor or a quantity derived therefrom is compared with a set value or a set curve using an evaluation unit, and wherein the acceleration sensor is designed as a three-axis acceleration sensor configured to be calibrated to a preset acceleration direction with respect to the acceleration sensor's orientation;

at least one further drive device, by means of which the flap or a further flap is displaceable between a retracted position and at least one extended position with respect to a wing box of the aircraft;

at least one further support construction which is arranged on the wing box in the region of the further drive device, to which support construction the flap or the further flap is coupled and which comprises a further movable support element which is movable with respect to the wing box for the displacement of the flap or the further flap; and at least one further acceleration sensor for the detection of accelerations of the flap or the further flap, which sensor is arranged in the region of the flap or the further flap or the further movable support element, wherein an output signal of the further acceleration sensor or a quantity derived therefrom is compared with a set value or a set curve using an evaluation unit, wherein the further acceleration sensor is designed as a three-axis acceleration sensor configured to be calibrated to a preset acceleration direction with respect to the further acceleration sensor's orientation, the evaluation unit being configured to evaluate the signals of the acceleration sensors in such a way that using the deviations of the output signal or a quantity derived therefrom from the set value or set curve, unwanted movements caused by a fault in the drive device are detected, wherein output signals which are detected by all acceleration sensors in equal or almost equal measure are not considered by the evaluation unit for the fault detection.

* * * * *